(12) United States Patent
Innings

(10) Patent No.: US 7,159,538 B2
(45) Date of Patent: Jan. 9, 2007

(54) TEAT CUP TAKE OFF

(75) Inventor: Lars Innings, Huddinge (SE)

(73) Assignee: Delaval Holding AB, Tumba (SE)

( * ) Notice: Subject to any disclaimer, the term of this patent is extended or adjusted under 35 U.S.C. 154(b) by 204 days.

(21) Appl. No.: 10/497,608

(22) PCT Filed: Dec. 17, 2002

(86) PCT No.: PCT/SE02/02349

§ 371 (c)(1),
(2), (4) Date: Nov. 29, 2004

(87) PCT Pub. No.: WO03/055296

PCT Pub. Date: Jul. 10, 2003

(65) Prior Publication Data

US 2005/0072362 A1    Apr. 7, 2005

(30) Foreign Application Priority Data

Dec. 21, 2001   (SE)   .................................... 0104370

(51) Int. Cl.
*A01J 5/07* (2006.01)
(52) U.S. Cl. ................. 119/14.08; 119/14.38
(58) Field of Classification Search ............ 119/14.08, 119/14.14, 14.27, 14.37, 14.38, 14.4, 14.47, 119/14.48, 14.49
See application file for complete search history.

(56) References Cited

U.S. PATENT DOCUMENTS 4,211,184 A    7/1980  Abrahamson et al.
5,860,388 A *  1/1999  Tan et al. ................. 119/14.44
5,992,347 A * 11/1999  Innings et al. ........... 119/14.07
6,009,832 A *  1/2000  Innings et al. ........... 119/14.02
6,073,579 A *  6/2000  Innings et al. ........... 119/14.02
6,164,242 A * 12/2000  Olofsson .................. 119/14.02
6,494,163 B1* 12/2002  Oort .......................... 119/14.1

FOREIGN PATENT DOCUMENTS

DE    25 25 721 A1    12/1976
EP    0 430 526 A1     6/1991
GB    1 440 085        6/1976
WO    WO 98/28969      7/1998
WO    WO 00/45630      8/2000

* cited by examiner

*Primary Examiner*—Yvonne R Abbott
(74) *Attorney, Agent, or Firm*—Harness, Dickey & Pierce, P.L.C.

(57) ABSTRACT

The present invention relates to a method and a milking machine comprising at least one teat cup for application to a teat of an animal to be milked, a teat cup liner, mounted in said teat cup, defining a teat receiving space inside said liner, and a pulsating chamber between said liner and said teat cup, said liner having a teat receiving end portion, a vacuum source for applying a vacuum level to the teat receiving space for drawing milk from said animal, a pulsator for application of a pulsating vacuum to the pulsating chamber for moving the teat cup liner between a closed position and an open position, thereby massaging said teat of said animal, and a vacuum sensor for sensing the vacuum level in said teat receiving end portion. The invention is further characterized in that said milking machine is arranged to initiated take off of said at least one teat cup, if a vacuum level sensed by said vacuum sensor indicates that the vacuum level in said teat receiving end portion is rapidly increasing.

14 Claims, 3 Drawing Sheets

TEAT CUP TAKE OFF

TECHNICAL FIELD

The present invention relates to a method for automatic milking and a milking machine. More specifically, the present invention relates to a method and a milking machine for initiating take off of teat cups from an animal.

BACKGROUND OF THE INVENTION

In automatic milking systems the take off of teat cups has been automated for some time. Early systems for initiating take off were solely based on a timer. When the timer ran out, the teat cups were removed. The time had to be set as an average milking time for the whole herd of milking animals. This naturally meant that a substantial part of the heard were over-milked, i.e. the teat cups were not removed in due time, resulting in pain and injury for these animals, while another significant part were under-milked, resulting in lost milk production and thus lost profit.

To avoid the problems mentioned above, the take off is initiated, in more recent milking machines, based on the milk flow, the amount of drawn milk, or a combination thereof, and also possibly in combination with a timer. For milking machines employing a milk claw and where all four teat cups are taken off simultaneously, the take off is initiated based on the combined milk flow from all four teats. Since it is common that the milk flow from an individual teat ends relatively abruptly (FIG. 1), and each quarter for a specific animal contains different amount of milk, the milk flow stops at different times for each teat. This means that some quarters for an animal will be over-milked, when all milk is drawn from the quarter finishing last.

Since the milk flow and/or milk quantity is measured by a flow or quantity meter downstream of the teat and not measured at the teat cup, there will be a time delay between the actual ending of the milk flow and the measurement of decreased milk flow, resulting in some over-milking even for the last quarter.

In the case with individual quarter milking, as employed for instance in automatic robotic milking machines, the teat cups are removed individually and some of the problems mentioned above are reduced. However, the problem with the time delay between actual milk flow end and measured milk flow end still prevails.

In some milking systems, a scheme to reduce the effects of automatic milking during low milk flow, is employed, reducing the vacuum level in the teat receiving space during the initial stage of milking, when the animal has not yet been stimulated enough to let down the milk, and during the late stage when the milk flow is diminishing. By measuring the milk flow, the regulation of the vacuum level in the teat receiving space can be controlled. Even though the system improves the situation, by both caring for the animal as well as allow for drawing as much milk as possible, the regulation will not be optimal, since the measurement of the milk flow is delayed from the actual milk flow changes due to the milk flow meter being positioned away from the teat.

U.S. Pat. No. 6,009,832 "A method for controlling the milking of an animal and a milking machine" by the present inventor et al. disclose a method to control the milking intensity by monitoring the abrupt movement of a teat cup liner between an open and a closed position. This movement is an indication of the milk flow. The method require the consideration of certain milking machine related conditions, such as e.g. the length of different pipes, the effect of the vacuum pump etc. "Machine milking and Lactation" edited by A. J. Bramelyr F. H. Dodd, G. A. Mein & J. A. Bramley shortley discuss measuring vacuum levels in the mouthpiece of a teat cup liner.

SUMMARY OF THE INVENTION

It is a main object of the present invention to provide such apparatus and method that improve the detection of the end of milk flow with respect to the occurrence in time and detects the end of milk flow independently for each teat.

It is in this respect a particular object of the invention to provide such apparatus and method that initiate take off of teat cups when the end of milk flow is detected.

It is still a further object of the invention to provide such apparatus and method that reduce the vacuum in the teat receiving space of the teat cup liner for all teat cups connected to a claw, when the end of milk flow is detected for at least one udder quarter.

These objects among others are, according to a first aspect of the present invention, attained by a milking machine comprising at least one teat cup for application to a teat of an animal to be milked, a teat cup liner, mounted in said teat cup, defining a teat receiving space inside said liner, and a pulsating chamber between said liner and said teat cup, where said liner has a teat receiving end portion. The milking machine further comprises a vacuum source for applying a vacuum level to the teat receiving space for drawing milk from said animal, a pulsator for application of a pulsating vacuum to the pulsating chamber for moving the teat cup liner between a closed position and an open position, thereby massaging said teat of said animal, and a vacuum sensor for sensing the vacuum level in said teat receiving end portion. The milking machine is arranged to initiated take off of said at least one teat cup, if a vacuum level sensed by said vacuum sensor indicates that the vacuum level in said teat receiving end portion is rapidly increasing.

These objects among others are attained, according to a second aspect of the present invention, by a method for initiating take off in a milking machine comprising at least one teat cup for application to a teat of an animal to be milked, a teat cup liner, mounted in said teat cup, defining a teat receiving space inside said liner, and a pulsating chamber between said liner and said teat cup, where said liner has a teat receiving end portion, a vacuum source for applying a vacuum level to the teat receiving space for drawing milk from said animal, a pulsator for application of a pulsating vacuum to the pulsating chamber for moving the teat cup liner between a closed position and an open position, thereby massaging said teat of said animal, and a vacuum sensor for sensing the vacuum level in said teat receiving end portion. The method comprises the steps of measuring the vacuum in said teat receiving end portion, and initiating take off if said measured vacuum is rapidly increasing.

The inventor has cleverly realized that, by observing the change of vacuum level in the teat receiving end portion in a teat cup, an accurate and timely indication of the end of milk flow from the teat can be achieved and that this may be utilised to initiate take off of a teat cup.

An advantage of the present invention is that a precise determination of the end of milk flow can be made for each teat independently.

A further advantage is that initiation of teat cup take off can be made precisely for each individual teat with regards to the end of milk flow for the respective teat.

Yet a further advantage is that a gentle treatment of a milking animal is achieved while keeping milk yield high.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given herein below and the accompanying FIGS. 1–3, which are given by way of illustration only, and thus are not limitative of the present invention.

PREFERRED EMBODIMENTS

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
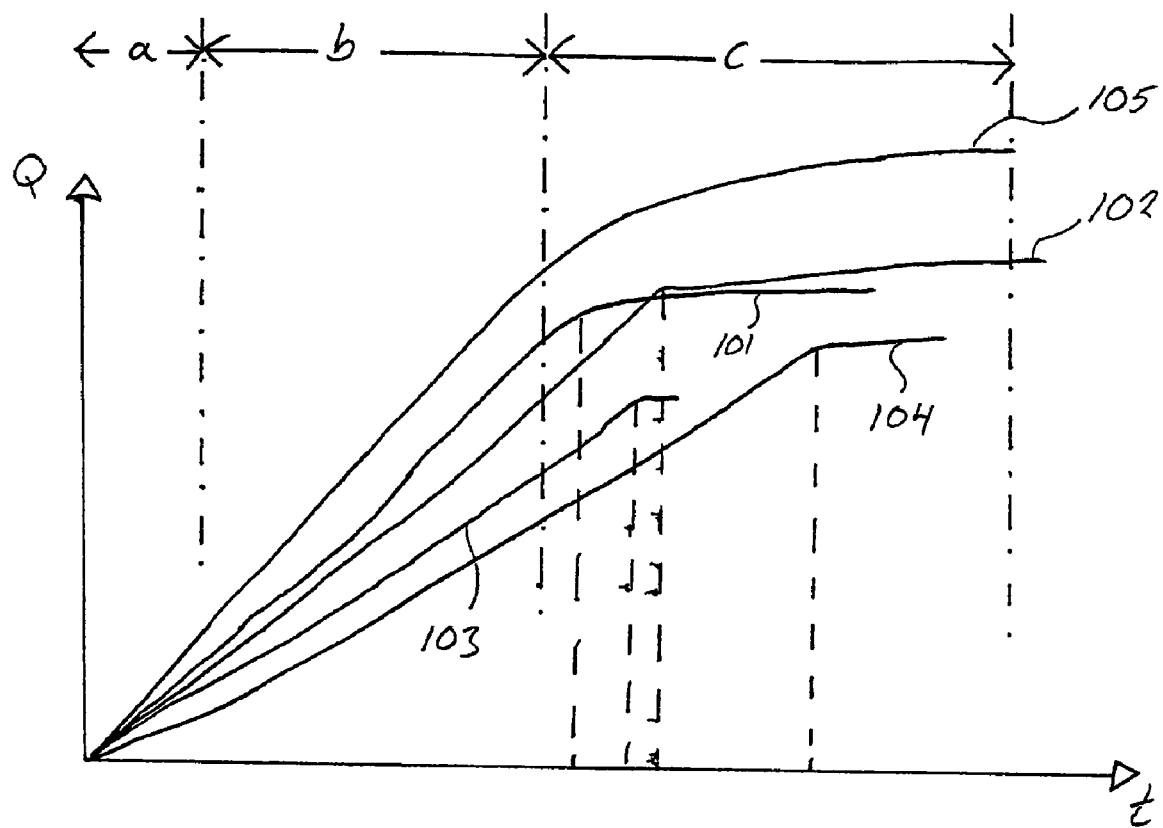
FIG. 1 shows a schematic diagram over the milk yield for each udder quarter and the combined milk yield for the udder quarters over time for one milking.

FIG. 1 shows a schematic diagram over the milk yield for each individual teat 101, 102, 103 and 104, respectively, as well as for the combine milk yield for all teats together 105. The milking sequence can be divided into three phases, a first relatively short phase a where milk flow increases, a second phase b with a relatively constant milk flow and a third phase c with declining milk flow. The different phases are indicated in the figure with vertical dash-dotted lines.

For all quarters, except the quarter having the plot denoted 101, the milk flow ends rapidly at individually different times, as indicated in the figure with dashed vertical lines. This means, that if milking continues up to the end of phase c (indicated by the right-most vertical line in FIG. 1) a significant over milking will occur for at least three of the teats.

Figure 2A:
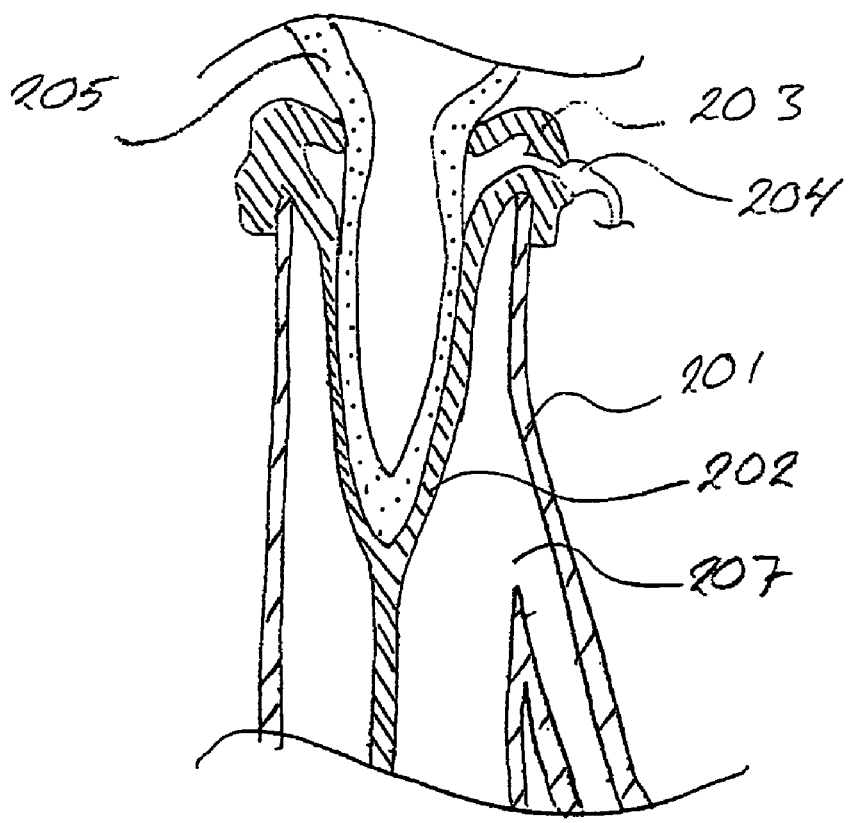
FIG. 2a shows a view in cross section of a teat cup and teat cup liner in a collapsed state according to a preferred embodiment of the invention.
Figure 2B:
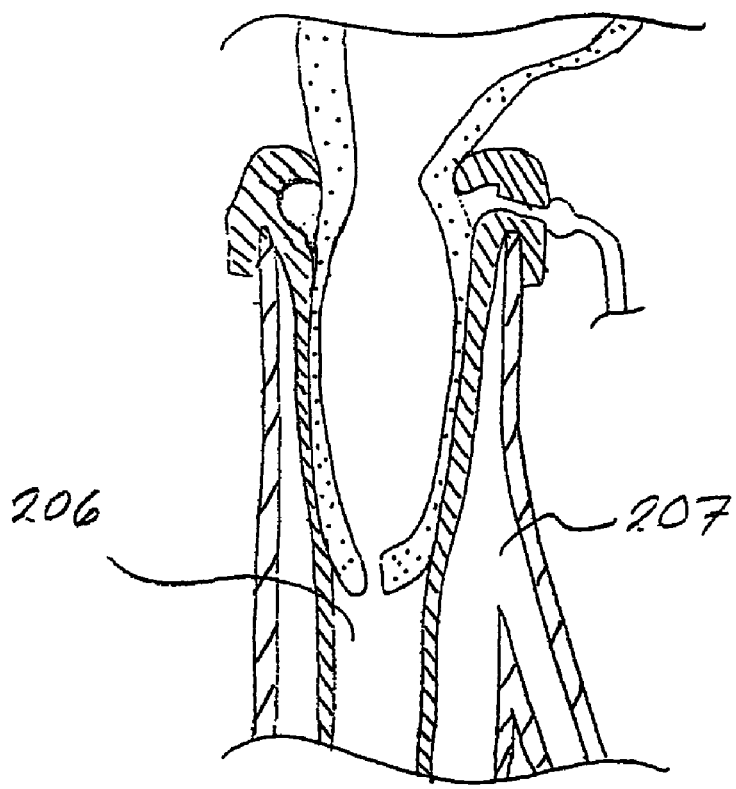
FIG. 2b shows a view in cross section of a teat cup and teat cup liner in an open state according to a preferred embodiment of the invention.

FIG. 2 shows two drawings with a teat cup 201 and a teat cup liner 202 in a collapsed state, FIG. 2a, and in an open state, FIG. 2b. The teat cup liner has a teat receiving end portion 203 with a vacuum sensor 204 for measuring the vacuum level in the teat receiving end portion. As can be seen from FIG. 2 the teat receiving end portion 203 forms a chamber between the teat cup liner 202 and a teat 205 in which chamber the vacuum in the teat receiving end portion 203 is measured. The teat 205 is shown introduced into the teat receiving space 206 of the liner 202. A vacuum level is applied to the teat receiving space 206 in a conventional manner. The vacuum level in the teat receiving space 206 is usually approximately between 40 and 50 kPa, but may be set lower for instance during the start of milking and/or during the end thereof.

A pulsating vacuum is applied to the pulsating chamber 207 to make the teat cup liner rhythmically collapse and expand. Thus, the milking animal is stimulated to release the milk.

Figure 3:
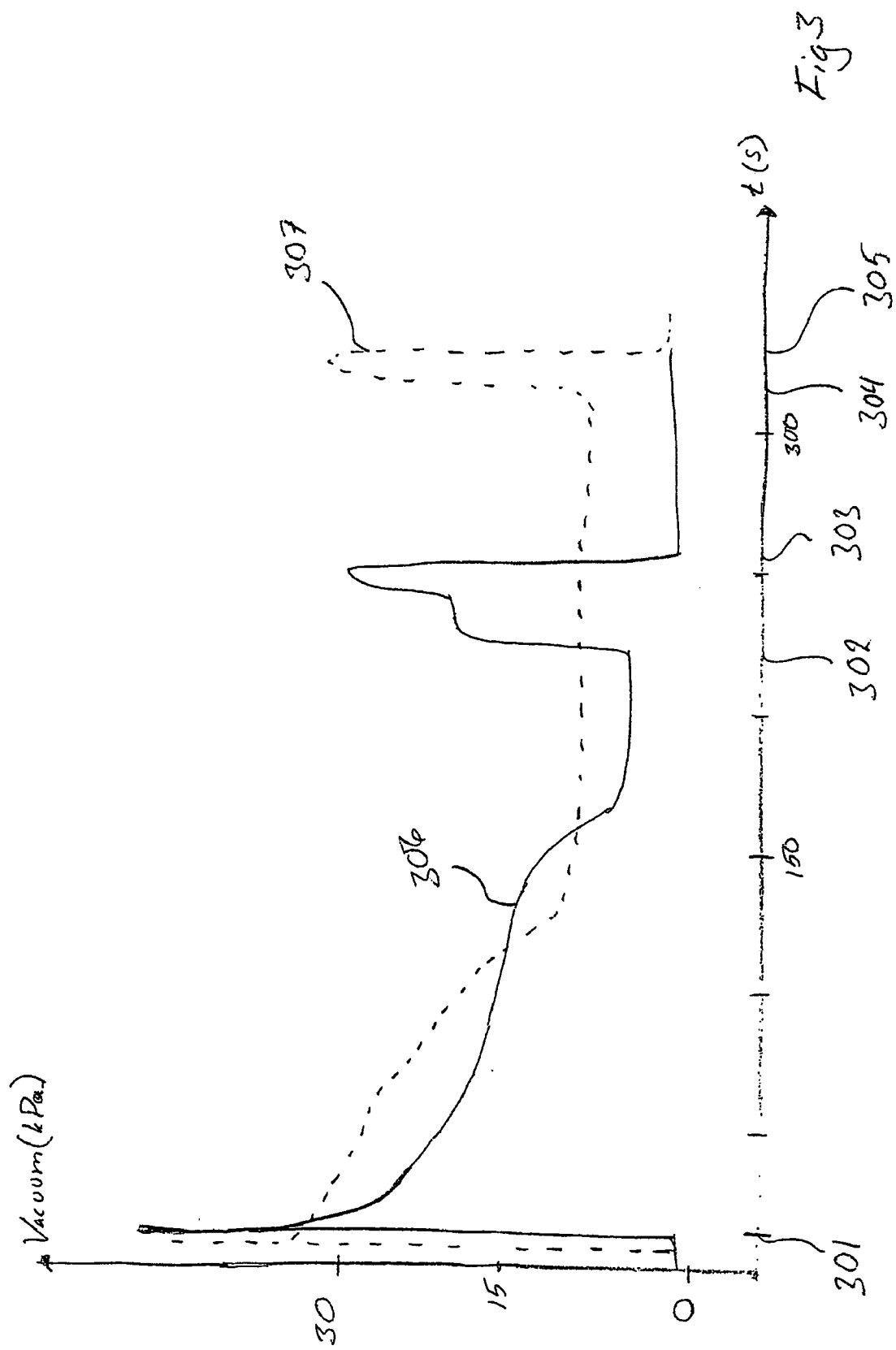
FIG. 3 shows a diagram over the typical teat receiving end portion vacuum for two different teats during a milking run.

FIG. 3 shows a schematic plot of the vacuum level in the teat receiving end portion as sensed by the vacuum sensor 204 for two typical teats during a milking run. At a time indicated by 301 the teat cups are applied to the teats of a milking animal. Up to the time indicated by 302 the vacuum level in the teat receiving end portion decreases for both teats, however at time 302 the vacuum level rapidly increases for a first of the teats as indicated by the plot 306. The teat cup take off is thus initiated, the teat cup removed, and the vacuum level in the teat receiving end portion drops to zero at time 303.

Teat cup take off, for the purpose of this description, should be regarded as possibly including a number of different phases and actions. When a milking claw is used, take off traditionally means removing the four teat cups from the teats of the animal, while for automatic robotic milking machines teat cup take off only implies take off of a specific teat cup. However, in this description initiating take off could for instance include reducing the vacuum level in the teat receiving space before removing one or several teat cups, operating a valve for shutting off the vacuum supply to a teat receiving space for one or several teat cups or simply removing one or several teat cups from the teats of the animal, as well as any other action taken during milking in preparation for the eventual removal of the teat cup from the teat. The event "initiate take off" may also relate to one individual teat cup as well as any number of teat cups.

At time 304 the vacuum level in the teat receiving end portion for a second of the teats rapidly increases as indicated by the plot 307. The take off is initiated and the vacuum level drops to zero at time 305.

A traditional milk flow measuring device would need some time span to integrate the milk flow, to be able to give an indication that the milk flow has ceased. However, measurement of the vacuum level in the teat receiving end portion gives direct results based on only one or a couple of pulsating cycles.

If individual take off is not possible, for instance when a milking claw is utilised, the indication by the vacuum increase in the teat receiving end portion, i.e. that the milk flow has ended for that particular udder quarter, may trigger a valve to close of the vacuum to the teat receiving space 206 for the relevant teat cup. Since the vacuum is shut off the particular teat cup will no longer help to carry the weight of the milking claw. If several teat cups are shut off, the claw will eventually fall off if no measures are taken. Such measures may for instance be conventional means for carrying the weight of the milking claw during milking, described in the state of art.

The vacuum level in the teat receiving space 206 may be reduced to, for instance, approximately 30 kPa. If a traditional milking claw is used the milking vacuum in the teat receiving space will thus be reduced in all teat cups, however milking will of course still continue.

A timer could be used, in a per se conventional way, to prevent premature take off, if the vacuum level for some reason would increase in the teat receiving end portion too early.

It will be obvious that the invention may be varied in a plurality of ways. For instance may the sensor for measuring the vacuum in the teat receiving end portion of a teat cup liner be placed away from the teat cup liner, and tubing may be used for conveying the vacuum to the sensor. The sensor may advantageously be positioned in the teat cup or the teat cup claw. Such variations are not to be regarded as a departure from the scope of the invention. All such modifications as would be obvious to one skilled in the art are intended to be included within the scope of the appended claims.

The invention claimed is:

1. A milking machine comprising
   at least one teat cup for application to a teat of an animal to be milked,
   a teat cup liner, mounted in said teat cup, defining a teat receiving space inside said liner, and a pulsating chamber between said liner and said teat cup, said liner having a teat receiving end portion,
   a vacuum source for applying a vacuum level to the teat receiving space for drawing milk from said animal,
   a pulsator for application of a pulsating vacuum to the pulsating chamber for moving the teat cup liner between a closed position and an open position, thereby massaging said teat of said animal, and
   a vacuum sensor for sensing the vacuum level in said teat receiving end portion, wherein
   said milking machine is arranged to initiated take off of said at least one teat cup, if a vacuum level sensed by said vacuum sensor indicates that the vacuum level in said teat receiving end portion is rapidly increasing during milking.

2. The milking machine according to claim 1, wherein said milking machine comprises four teat cups each having a teat receiving end portion and where said milking machine is arranged to individually initiated take off of each individual teat cup from said respective teat when the vacuum in a respective of said teat receiving end portions is rapidly increasing during milking.

3. The milking machine according to claim 1, wherein said milking machine comprises a robot for automatic application of teat cups to the teats of said animal.

4. The milking machine according to claim 1, wherein said milking machine comprises four teat cups connected to a milking claw.

5. The milking machine according to claim 1, wherein said initiation of take off comprises reducing the vacuum level in the teat receiving space.

6. The milking machine according to claims 1, wherein said initiation of take off comprises operating a valve to shut off vacuum supply to said teat receiving space.

7. The milking machine according to claim 1, further comprising a timer and
   said milking machine is arranged to initiate take off if said vacuum level in said teat receiving end portion increases after a first predetermined time has passed, since application of said at least one teat cup, according to said timer, and/or
   said milking machine is arranged to initiate take off if said vacuum level in said teat receiving end portion has not increased after a second predetermined time has passed, since application of said at least one teat cup, according to said timer.

8. Method for initiating take off in a milking machine comprising
   at least one teat cup for application to a teat of an animal to be milked,
   a teat cup liner, mounted in said teat cup, defining a teat receiving space inside said liner, and a pulsating chamber between said liner and said teat cup, said liner having a teat receiving end portion,
   a vacuum source for applying a vacuum level to the teat receiving space for drawing milk from said animal,
   a pulsator for application of a pulsating vacuum to the pulsating chamber for moving the teat cup liner between a closed position and an open position, thereby massaging said teat of said animal, and
   a vacuum sensor for sensing the vacuum level in said teat receiving end portion, wherein
   measuring the vacuum in said teat receiving end portion,
   initiating take off if said measured vacuum is rapidly increasing.

9. The method according to claim 8 wherein the milking machine comprises four teat cups each having a teat receiving end portion and comprising the further steps of
   individually measuring the vacuum level in each of said four teat receiving end portions,
   individually initiate take off of a teat cup from a respective teat if the vacuum level in a respective teat receiving end portion is rapidly increasing.

10. The method according to claim 8, wherein said milking machine comprises a robot for automatic application of said at least one teat cup to the teat of said animal.

11. The method according to claim 8, wherein said milking machine comprises four teat cups connected to a milking claw.

12. The method according to claim 8, wherein said initiation of take off comprises reducing the vacuum level in the teat receiving space.

13. The method according to claim 8, wherein said initiation of take off comprises operating a valve to shut off vacuum supply to said teat receiving space.

14. The method according to claim 8, wherein said milking machine further comprises a timer and further comprising the steps of:
   initiating take off if said vacuum level in said teat receiving end portion increases after a first predetermined time has passed, since application of said at least one teat cup, according to said timer, and/or
   initiating take off if said vacuum level in said teat receiving end portion has not increased after a second predetermined time has passed, since application of said at least one teat cup, according to said timer.

* * * * *